US008674963B2

(12) United States Patent
Cornish et al.

(10) Patent No.: US 8,674,963 B2
(45) Date of Patent: Mar. 18, 2014

(54) WAVEGUIDE CONFIGURATIONS FOR OPTICAL TOUCH SYSTEMS

(75) Inventors: Benjamin Cornish, Brooklyn, NY (US); Robert Bruce Charters, Acton (AU); Ian Andrew Maxwell, New South Wales (AU); Graham Roy Atkins, Kaleen (AU); Dax Kukulj, Acton (AU); Graeme Gordon, Kelty (GB)

(73) Assignee: Zetta Research and Development LLC—RPO Series, Wilmington, DE (US)

( * ) Notice: Subject to any disclaimer, the term of this patent is extended or adjusted under 35 U.S.C. 154(b) by 868 days.

(21) Appl. No.: 11/859,331

(22) Filed: Sep. 21, 2007

(65) Prior Publication Data

US 2008/0074402 A1    Mar. 27, 2008

(30) Foreign Application Priority Data

Sep. 22, 2006 (AU) ................................ 2006905255

(51) Int. Cl.
*G06F 3/042* (2006.01)

(52) U.S. Cl.
USPC .......... 345/175; 345/173; 178/18.09; 385/39; 385/129

(58) Field of Classification Search
USPC ........ 345/173, 175, 176, 179, 156; 385/4, 14, 385/31–50, 129–132; 178/18.09, 18.11
See application file for complete search history.

(56) References Cited

U.S. PATENT DOCUMENTS

| | | |
|---|---|---|
| 3,478,220 A | 11/1969 | Milroy |
| 3,673,327 A | 6/1972 | Johnson et al. |
| 4,988,893 A | 1/1991 | Bonneau et al. |
| 5,196,836 A | 3/1993 | Williams |
| 5,914,709 A | 6/1999 | Graham et al. |
| 6,181,842 B1 | 1/2001 | Francis et al. |
| 6,351,260 B1 | 2/2002 | Graham et al. |
| 6,992,659 B2 | 1/2006 | Gettemy |
| 7,099,553 B1 | 8/2006 | Graham |
| 7,267,930 B2 | 9/2007 | Payne |
| 7,352,940 B2 * | 4/2008 | Charters et al. ............... 385/129 |
| 7,369,724 B2 | 5/2008 | Deane |
| 7,412,119 B2 * | 8/2008 | Smits ............................ 385/14 |
| 7,471,865 B2 * | 12/2008 | Graham ....................... 385/132 |
| 7,786,983 B2 * | 8/2010 | Graham ....................... 345/175 |
| 8,023,780 B2 * | 9/2011 | Juni ............................. 385/14 |
| 2002/0088930 A1 | 7/2002 | Graham et al. |
| 2004/0201579 A1 * | 10/2004 | Graham ....................... 345/175 |
| 2005/0201681 A1 | 9/2005 | Payne |
| 2005/0271319 A1 | 12/2005 | Graham |
| 2005/0271326 A1 | 12/2005 | Luo |
| 2006/0001653 A1 | 1/2006 | Smits |
| 2006/0001654 A1 | 1/2006 | Smits |
| 2006/0002655 A1 | 1/2006 | Smits |

(Continued)

FOREIGN PATENT DOCUMENTS

JP          63076012 A      4/1988

OTHER PUBLICATIONS

Payne, U.S. Appl. No. 11/965,230.

*Primary Examiner* — Dmitriy Bolotin
(74) *Attorney, Agent, or Firm* — Mattingly & Malur, PC

(57) ABSTRACT

Waveguide structures and optical elements for use in an optical touch input device are disclosed. The disclosed waveguide structures and optical elements allow for reduced bezel width and simplified assembly of optical touch input devices, and relaxed component tolerances.

24 Claims, 14 Drawing Sheets

(56) References Cited

U.S. PATENT DOCUMENTS

| | | |
|---|---|---|
| 2006/0114244 A1 | 6/2006 | Saxena et al. |
| 2007/0024598 A1 | 2/2007 | Miller |
| 2007/0154133 A1 | 7/2007 | Graham |
| 2007/0165008 A1 | 7/2007 | Crockett |
| 2010/0259508 A1* | 10/2010 | Nishio et al. .................. 345/175 |

* cited by examiner

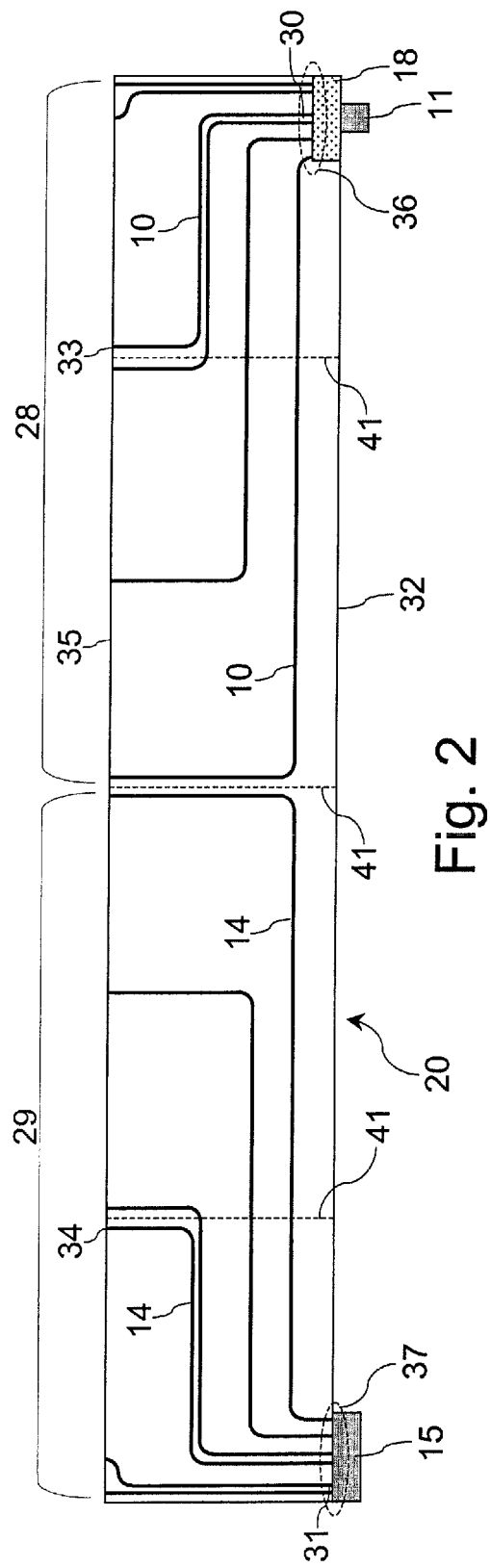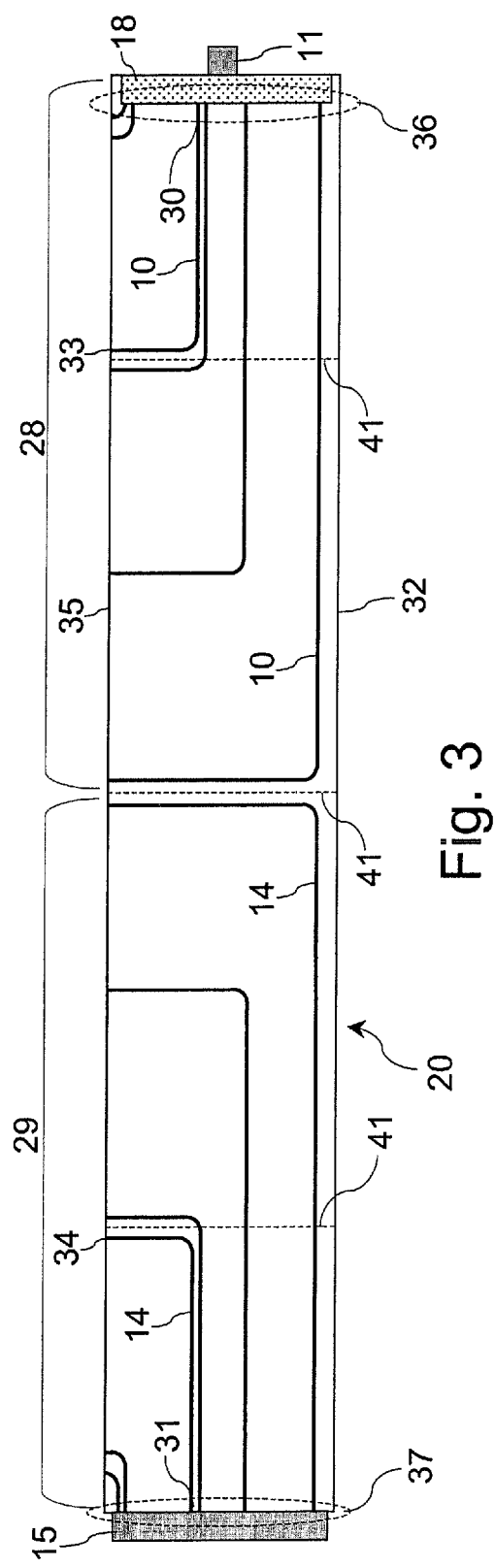

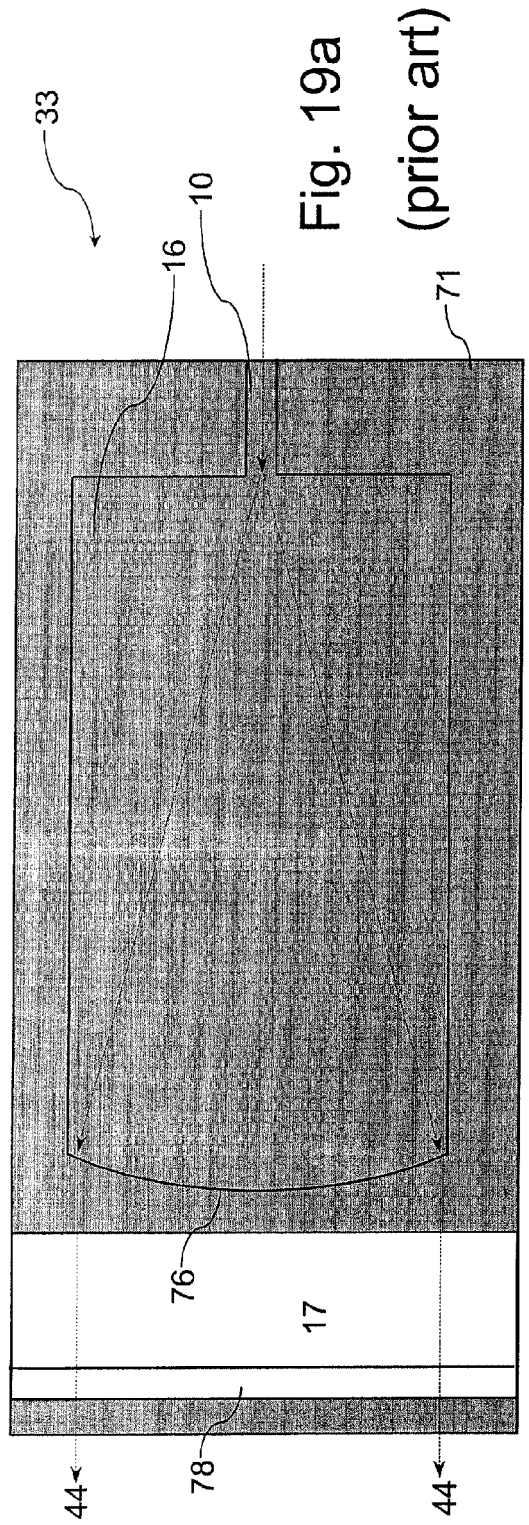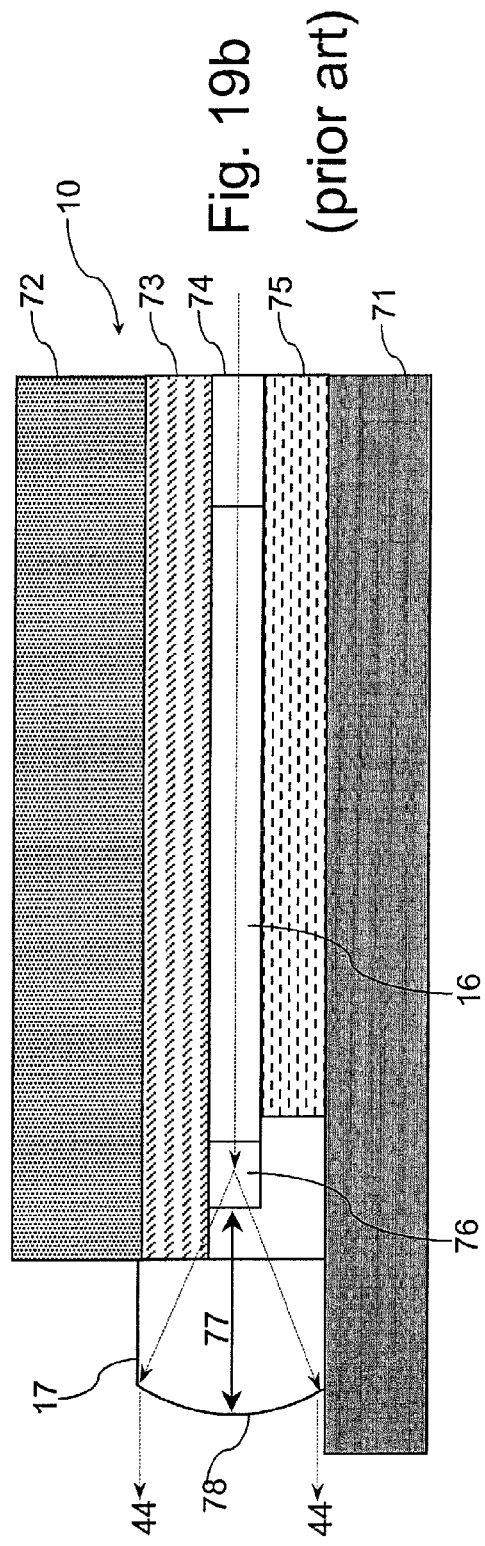
Fig. 19a (prior art)
Fig. 19b (prior art)

WAVEGUIDE CONFIGURATIONS FOR OPTICAL TOUCH SYSTEMS

TECHNICAL FIELD

Input systems are disclosed, and in particular, optical touch systems having relatively reduced bezel dimensions.

BACKGROUND OF THE RELATED ART

Any discussion of the prior art throughout the specification should in no way be considered as an admission that such prior art is widely known or forms part of the common general knowledge in the field.

Touch input devices or sensors for computers and other consumer electronics devices such as mobile phones, personal digital assistants (PDAs) and hand-held games are highly desirable due to their extreme ease of use. In the past, a variety of approaches have been used to provide touch input devices. The most common approach uses a flexible resistive overlay, although the overlay is easily damaged, can cause glare problems, and tends to dim an underlying display, requiring excess power usage to compensate for such dimming. Resistive devices can also be sensitive to humidity, and the cost of the resistive overlay scales quadratically with perimeter. Another approach is capacitive touch, which also requires an overlay. In this case the overlay is generally more durable, but the glare and dimming problems remain.

In yet another common approach, a matrix of infrared light beams is established in front of a display, with a touch detected by the interruption of one or more of the beams. Such 'optical' touch input devices have long been known (U.S. Pat. No. 3,478,220; U.S. Pat. No. 3,673,327), with the beams generated by arrays of optical sources such as light emitting diodes (LEDs) and detected by corresponding arrays of detectors (such as phototransistors). They have the advantage of being overlay-free and can function in a variety of ambient light conditions (U.S. Pat. No. 4,988,983), but have a significant cost problem in that they require a large number of source and detector components, as well as supporting electronics. Since the spatial resolution of such systems depends on the number of sources and detectors, this component cost increases with display size and resolution.

An alternative optical touch input technology, based on integrated optical waveguides, is disclosed in U.S. Pat. No. 6,351,260, U.S. Pat. No. 6,181,842 and U.S. Pat. No. 5,914,709, and in US Patent Application Nos. 2002/0088930 and 2004/0201579. The basic principle of such a device is shown in FIG. 1. In this optical touch input device, integrated optical waveguides ('transmit' waveguides) 10 conduct light from a single optical source 11 to integrated in-plane lenses 16 that collimate the light in the plane of a display and/or input area 13 and launch an array of light beams 12 across that display and/or input area 13. The light is collected by a second set of integrated in-plane lenses 16 and integrated optical waveguides ('receive' waveguides) 14 at the other side of the screen and/or input area, and conducted to a position-sensitive (i.e. multi-element) detector 15. A touch event (e.g. by a finger or stylus) cuts one or more of the beams of light and is detected as a shadow, with position determined from the particular beam(s) blocked by the touching object. That is, the position of any physical blockage can be identified in each dimension, enabling user feedback to be entered into the device. Preferably, the device also includes external vertical collimating lenses (VCLs) 17 adjacent to the integrated in-plane lenses 16 on both sides of the input area 13, to collimate the light beams 12 in the direction perpendicular to the plane of the input area.

The touch input devices are usually two dimensional and rectangular, with two arrays (X, Y) of transmit waveguides 10 along adjacent sides of the input area, and two corresponding arrays of receive waveguides 14 along the other two sides. As part of the transmit side, in one embodiment a single optical source 11 (such as an LED or a vertical cavity surface emitting laser (VCSEL)) launches light via some form of optical power splitter 18 into a plurality of waveguides that form both the X and Y transmit arrays. The X and Y transmit waveguides are usually fabricated on an L shaped substrate 19, and likewise for the X and Y receive waveguides, so that a single source and a single position-sensitive detector can be used to cover both X and Y dimensions. However in alternative embodiments, a separate source and/or detector may be used for each of the X and Y dimensions. For simplicity, FIG. 1 only shows four waveguides per side of the input area 13; in actual touch input devices there will generally be sufficient waveguides for substantial coverage of the input area.

These prior art devices house the waveguide structures that form the X and Y transmit arrays within a protective bezel that surrounds the input area. Typically, the input area will coincide with a display, in which case the touch input device may be referred to as a 'touch screen'. Other touch input devices, sometimes referred to as 'touch panels', do not have a display. This disclosure applies to both types of input device. As will be appreciated, the bezel width necessarily limits the display size within a given touch screen device, which may be a significant limitation for small devices such as mobile phones. A further problem is that, to minimise the bezel width, the distance between the in-plane lenses and the external VCLs should be minimised, leading to a high magnification optical system that is extremely susceptible to errors in the design, fabrication and placement of the external VCLs.

SUMMARY OF THE DISCLOSURE

In satisfaction of the aforenoted needs, a waveguide structure for an input device is disclosed that has an input area defining a plane. The waveguide structure has at least one optical waveguide adapted to carry a signal for the input device. The waveguide structure is configured such that, in use, the at least one optical waveguide extends entirely below the plane.

The input device typically includes a substantially planar input surface for receiving user input. Preferably, the input surface defines the plane of the input area. The input device also includes a periphery defined by one or more sides, and in one embodiment, is substantially rectangular in shape.

The signal may comprise an input signal or an output signal. In an embodiment, the signal is light having a predetermined wavelength. The wavelength may be in the visible region of the spectrum or the infrared region of the spectrum. Desirably the wavelength is between about 700 and about 1000 nm.

The waveguide structure may include a plurality of optical waveguides, wherein each optical waveguide extends entirely below the plane.

Preferably the waveguide structure is substantially flexible and formed from polymeric materials. Optimally, the waveguide structure is bendable through at least 90° without suffering mechanical damage. In one embodiment, the waveguide structure comprises a plurality of polymer optical waveguides fabricated on a flexible polymer substrate.

The waveguide structure may extend around at least a portion of the periphery. The waveguide structure may also extend around adjacent sides of the periphery. However, in another embodiment, the waveguide structure extends around the entire periphery.

In an embodiment, the waveguide structure is disposed substantially perpendicularly to the plane of the input device. However, in other embodiments, the waveguide structure extends underneath and substantially parallel to the plane of the input device, and preferably lies substantially within the periphery.

The waveguide structure may be configured such that, in use, the at least one optical waveguide passes through a maximum of two mutually perpendicular planes.

The waveguide structure may be formed as a substantially rectangular two-dimensional sheet. However, in other embodiments, the waveguide structure is formed as a substantially L-shaped two-dimensional sheet.

In a particular embodiment, the waveguide structure comprises a plurality of input waveguides adapted to carry an input signal and a plurality of output waveguides adapted to carry an output signal. The input waveguides may be grouped on the waveguide structure to define a transmit section, and the output waveguides are grouped on the waveguide structure to define a receive section. Typically, the input waveguides are referred to as transmit waveguides and the output waveguides referred to as receive waveguides. Each waveguide includes an input portion for receiving an input signal and an output portion for transmitting an output signal. Typically, the waveguides are positioned such that the input portions of the transmit waveguides and the output portions of the receive waveguides are disposed on or proximate to a first side of the waveguide structure, and the output portions of the transmit waveguides and the input portions of the receive waveguides are disposed on or proximate to a second side of the waveguide structure, wherein the first and second sides are substantially mutually opposed. In this embodiment, the input portions of the transmit waveguides are grouped into an input array, and the output portions of the receive waveguides are grouped into an output array, each array extending along a portion of the first side. However, the output portions of the transmit waveguides and the input portions of the receive waveguides are spaced, preferably substantially evenly spaced, along substantially the entire length of the second side.

In other embodiments, the waveguides are positioned such that the input portions of the transmit waveguides and the output portions of the receive waveguides are disposed on or proximate to opposite sides of the waveguide structure, and the output portions of the transmit waveguides and the input portions of the receive waveguides are disposed on or proximate to a common side of the waveguide structure. The output portions of the transmit waveguides and the input portions of the receive waveguides may be spaced, preferably substantially evenly spaced, along substantially the entire length of the common side.

The input array is suitably optically couple-able with a light source and the output array is optically couple-able with a light detector, which may be a position-sensitive detector.

The output portions of the transmit waveguides and the input portions of the receive waveguides may include an integral structure, such as a planar lens. In other embodiments the integral structure may be a planar internally reflective mirror.

The waveguide structure may include at least one fold line defined by a line of weakness to assist in folding the waveguide structure about the periphery of an input device. In alternative embodiments, the fold line is a printed mark to assist in manual assembly with an input device and/or with an optical element. Alternatively, the printed mark is visible to a machine vision system when the waveguide structure is machine assembled with an input device.

An optical element for an input device is also disclosed that has an input area defining a plane. One disclosed optical element comprises a first reflective surface and a a connect portion adapted for connection to a waveguide structure having at least one optical waveguide adapted to carry an input signal or an output signal for the input device. The optical element is configured for use with the input device such that, in use, the first reflective surface is positioned above the plane to re-direct the signal to or from the optical waveguide. The connect portion is at least partially below the plane whereby the at least one optical waveguide extends entirely below the plane. The reflective surface may be a mirror adapted for optical communication with the connect portion. The mirror may be plane or arcuate in cross-section and is optionally metallised. However, in an embodiment, the first reflective surface is an internally reflective surface.

The optical element further includes a body of light transmissive material for transmission of the signal between the connect portion and the first reflective surface, in which case the first reflective surface is an internally reflective surface. The internally reflective surface may be a totally internally reflective surface. Preferably, the first reflective surface is curved thereby to focus the signal in a direction substantially perpendicular to the plane of the input device. Alternatively, the first reflective surface may be planar so that it does not focus the signal.

The optical element may include a second reflective surface that, in use, is positioned below the plane of the input device. An optical element having a second reflective surface is particularly useful when the waveguide structure extends underneath and substantially parallel to the plane of the input device. The second reflective surface may be an internally reflective surface, for example, a totally internally reflective surface. The second reflective surface may be curved so as to focus the signal in a direction substantially perpendicular to the plane of the input device. The second reflective surface may be curved in a cylindrical fashion so as to focus a plurality of signals associated with a plurality of optical waveguides. Alternatively, the second reflective surface may be planar.

The optical element is formed as a strip of plastics material substantially transparent to the signal light (e.g. in the infrared region of the spectrum) and opaque to light at other wavelengths (e.g. ambient visible light). The optical element may be injection moulded or extruded. Additionally, the optical element may be substantially rigid.

When formed as a strip of plastics material, the first reflective surface of the optical element may be arcuate in cross section thereby to focus a plurality of signals associated with a plurality of optical waveguides.

The optical element may further include a body of light transmissive material between the connect portion and the first reflective surface. The optical element may also include an optical surface through which light passes as it transits the input area. In some embodiments, this optical surface will be planar. Alternatively, it may be arcuate in cross section to form a lens portion thereby to focus the signal in a direction substantially perpendicular to the plane of the input device. Preferably, the optical surface is curved in a cylindrical fashion so as to focus a plurality of signals associated with a plurality of optical waveguides. Irrespective of the precise shape of the optical surface, the optical element may be shaped such that, in use, the exterior angle between the input device and the optical surface is greater than 90°. In related aspects, the optical element includes a recess such that the optical element is releasably attachable with the input device. Further, the waveguide structure may be fixedly attached to the optical element, for example, by gluing.

An apparatus is also disclosed that comprises an input device having an input area defining a plane and having a periphery. The apparatus further comprises a waveguide structure having at least one optical waveguide adapted to carry an input signal or an output signal for the input device. The apparatus further comprises one or more optical elements extending along at least a portion of the periphery and in optical communication with the at least one waveguide. Each optical element may extend from a position below the plane to a position above the plane such that, in use, each the optical element transmits the input signal or the output signal to or from the input area to the at least one waveguide extending entirely below the plane.

A method for transmitting input and output signals for an input device is also disclosed. The input device has an input area defining a plane and having a periphery. The method comprises providing at least one waveguide structure having at least one optical waveguide adapted to carry an input signal or an output signal for the input device. The at least one optical waveguide extending entirely below the plane. The method further comprises providing one or more optical elements along at least a portion of the periphery and optically coupling the waveguide structure with a respective optical element such that, in use, each the optical element transmits the input signal or the output signal to or from the input area to a respective waveguide extending entirely below the plane.

A method of reducing bezel width in an input device is also disclosed. The input device has an input area defining a plane and having a periphery. The method comprises providing at least one waveguide structure having at least one optical waveguide adapted to carry an input signal or an output signal for the input device, providing one or more optical elements along at least a portion of the periphery, and optically coupling the at least one optical waveguide with a respective optical element such that, in use, each the optical element transmits the input signal or the output signal to or from the at least one optical waveguide. The at least one optical waveguide is terminated at a position below the plane, and wherein the optical elements extend from above the plane to a position below the plane.

BRIEF DESCRIPTION OF THE DRAWINGS

Disclosed embodiments will now be described, by way of example only, with reference to the accompanying drawings, wherein:

FIG. 2 is a plan view of one embodiment of a waveguide structure in accordance with this disclosure;

FIG. 3 is a plan view of another embodiment of a waveguide structure in accordance with this disclosure;

FIGS. 19(a) and 19(b) show plan and side views of a typical prior art assembly of a transmit waveguide and an external vertical collimating lens.

DETAILED DESCRIPTION OF THE PRESENTLY PREFERRED EMBODIMENTS

Referring initially to FIGS. 2 to 9, a waveguide structure 20 for an input device in the form of a touch screen 21 is formed as a substantially two-dimensional sheet comprising a plurality of waveguides adapted to carry input signals or output signals for the touch screen 21. The touch screen 21 is substantially rectangular in shape and includes a substantially planar input surface 23 for receiving user input, such as the touch of a finger or a stylus. In this embodiment the input surface 23 coincides with the outer surface of a display 24 (such as a liquid crystal display (LCD)). In other embodiments the input surface may coincide with the outer surface of a transparent protective cover in front of a display.

Figure 4:
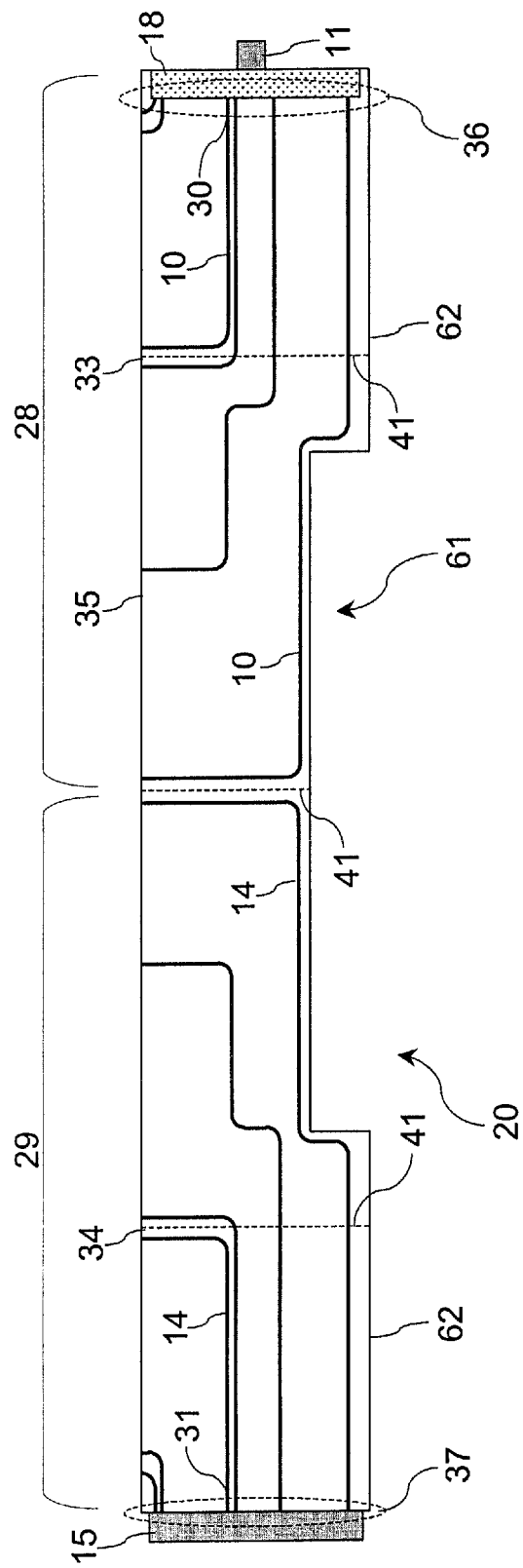
FIG. 4 is a plan view of yet a further embodiment of a waveguide structure in accordance with this disclosure, wherein the waveguide includes a recess to accommodate electrical connections to a display that the waveguide structure surrounds.
Figure 5:
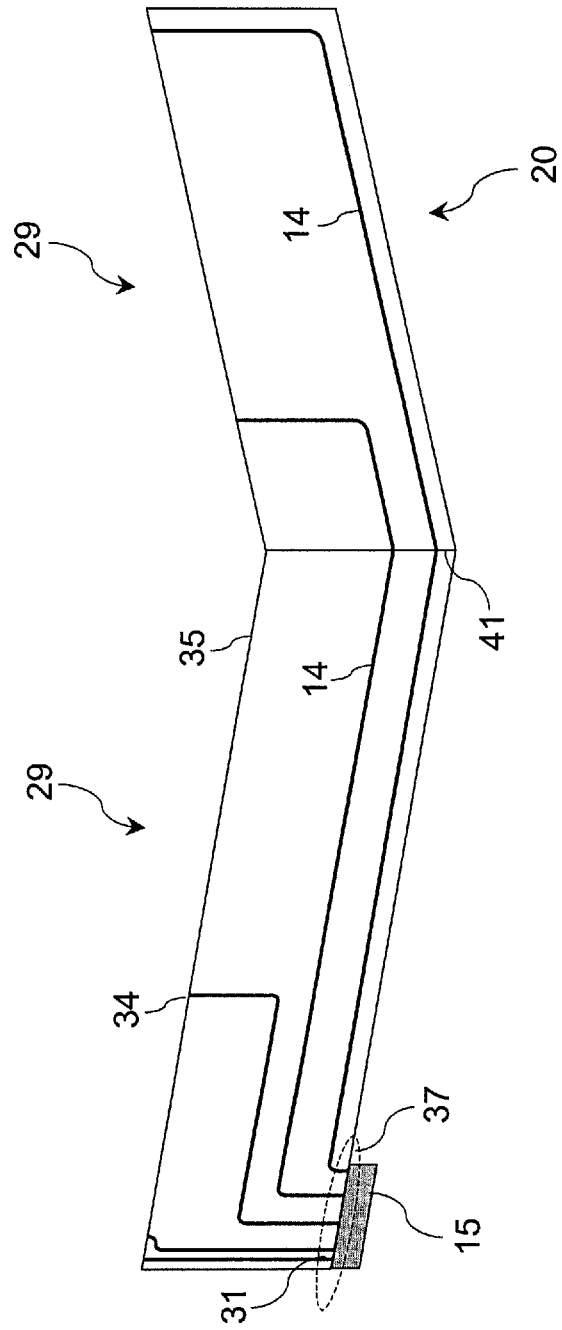
FIG. 5 is a perspective view of one half of the waveguide structure embodiment shown in FIG. 2, shown folded into an L-configuration and ready to be engaged to a display.
Figure 6:
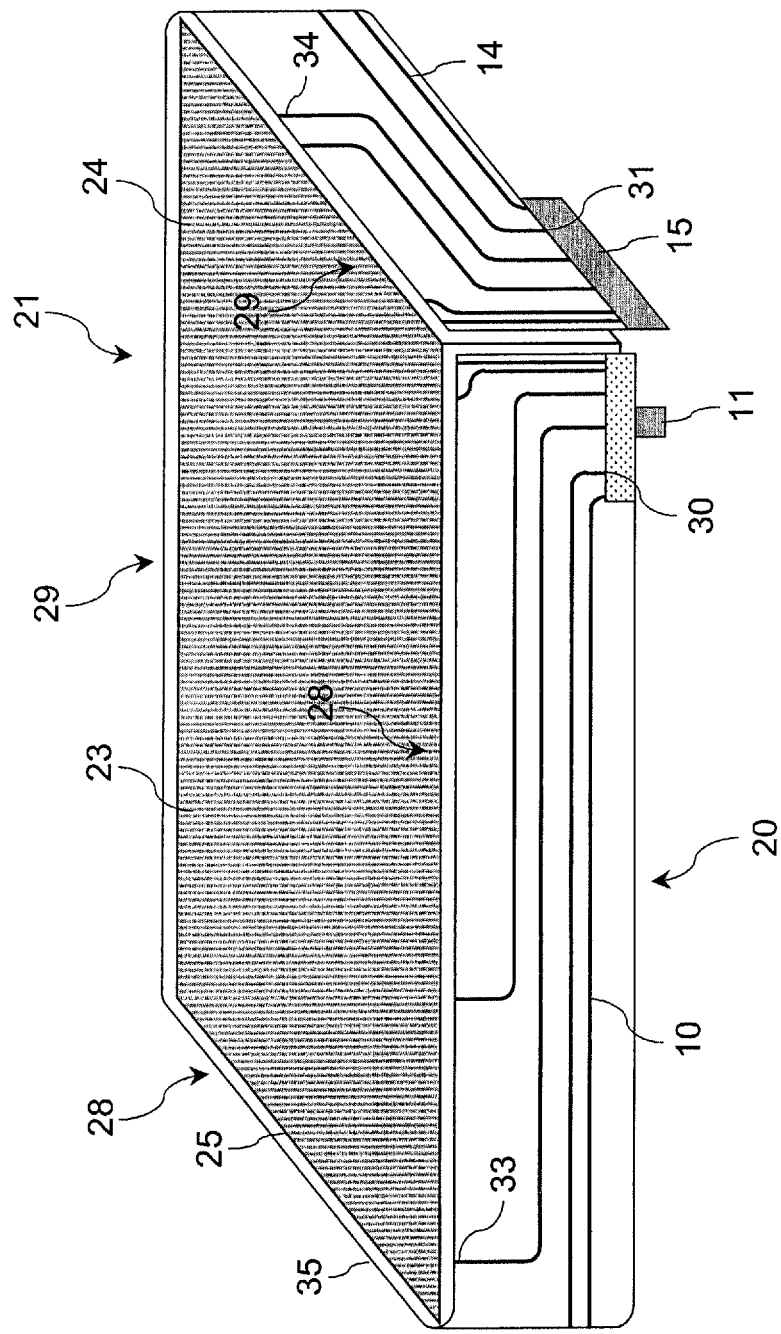
FIG. 6 is a perspective view of the waveguide structure embodiment shown in FIG. 2 engaged to a display.
Figure 7:
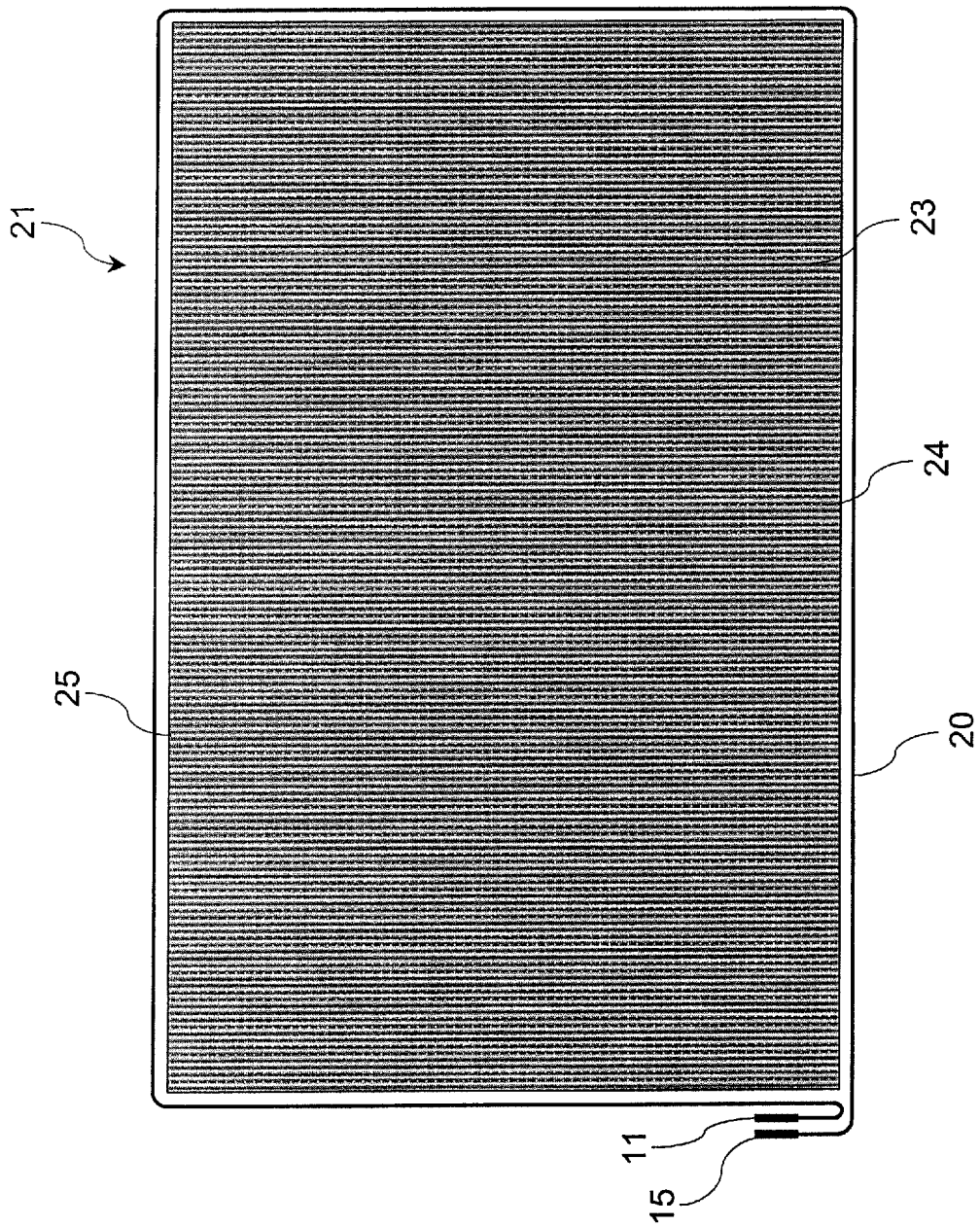
FIG. 7 is a top view of the waveguide structure embodiment shown in FIG. 3 engaged to a display.
Figure 8:
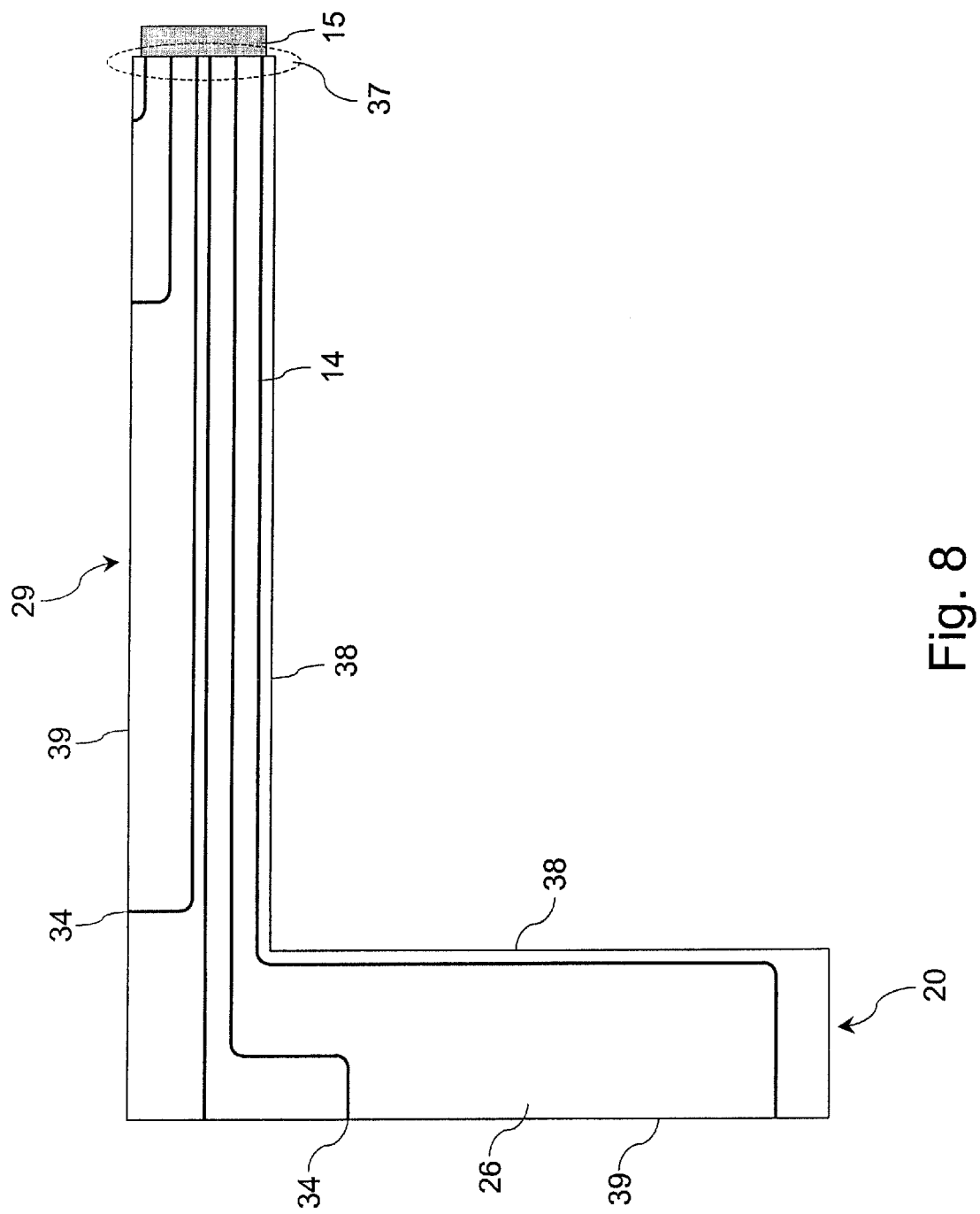
FIG. 8 is a plan view of another embodiment a waveguide structure in accordance with this disclosure.
Figure 9:
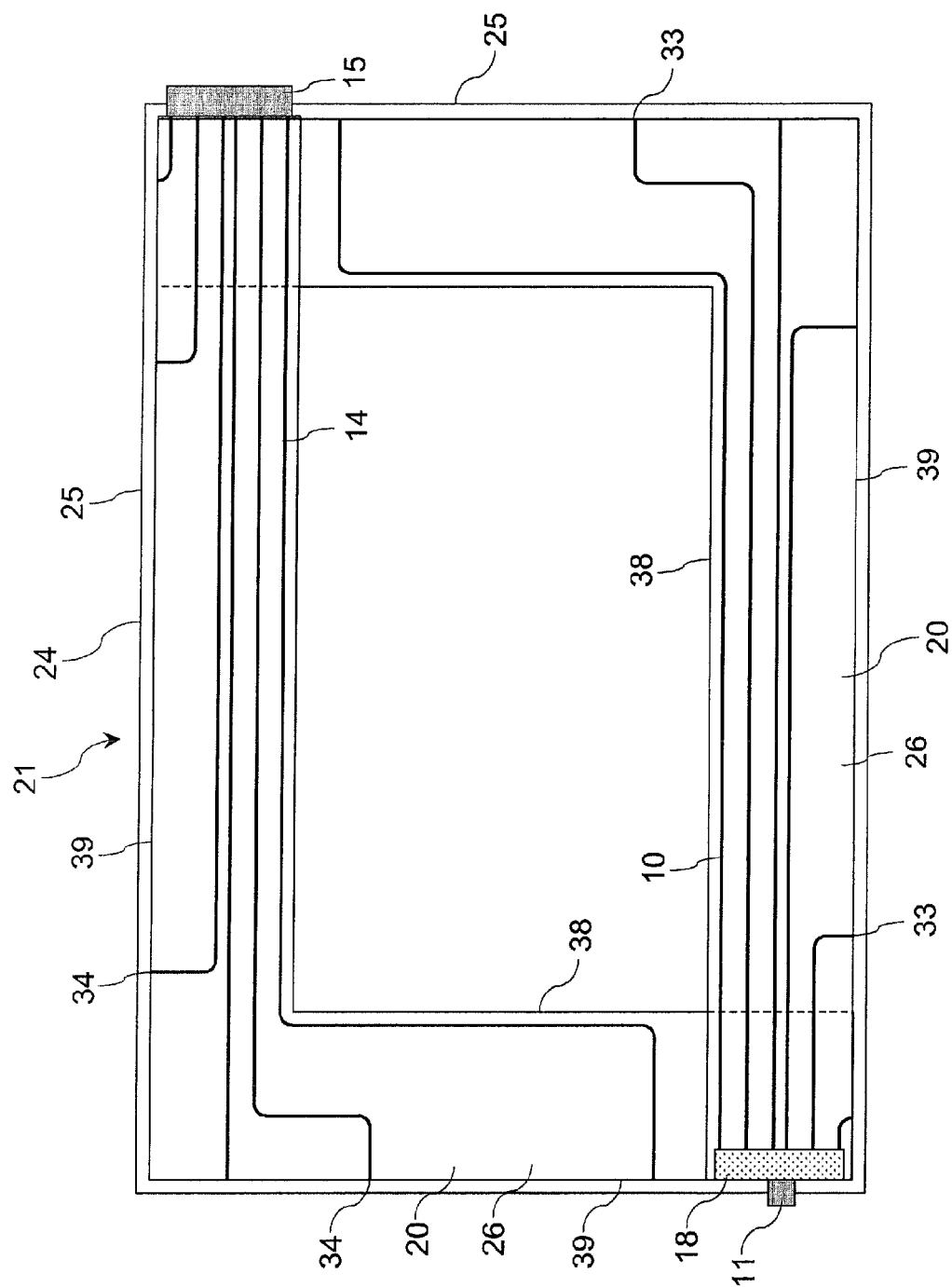
FIG. 9 is an underside view of a display showing a pair of the waveguide structure embodiments shown in FIG. 8 engaged thereto.
Figure 11:
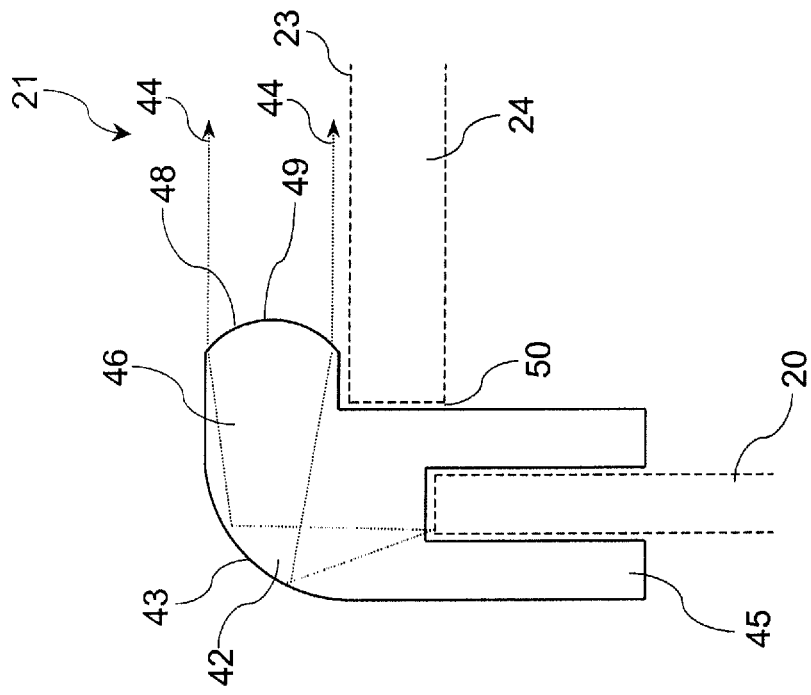
FIG. 11 is a view similar to FIG. 10 but showing another embodiment of an optical element in accordance with this disclosure.

In the various embodiments as shown in FIGS. 2 to 4, the substantially rectangular waveguide structure 20 is formed from a resilient plastics material that is substantially flexible. Preferably the waveguide structure 20 is repeatably and reversibly bendable through at least 90° without being mechanically damaged. For example, FIG. 5 shows one half of the waveguide structure 20 shown in FIG. 2 folded into an L-configuration and ready to be engaged to a display. FIG. 6 shows the entire waveguide structure 20 of FIG. 2 engaged to the periphery 25 of a display 24, and FIG. 7 shows waveguide structure 20 of FIG. 3 or FIG. 4 engaged to the periphery 25 of a display 24. In the embodiment shown in FIG. 8, the waveguide structure 20 is configured as an 'L', rather than a substantially rectangular sheet as shown in FIGS. 2 to 4. This embodiment is particularly useful when, as shown in FIG. 9, the waveguide structure is engaged to the underside of a display 24.

The waveguide structure 20 preferably comprises a plurality of optical waveguides comprising a photo-curable polymer material fabricated on a flexible polymer substrate, for example by a method disclosed in U.S. patent application Ser. No. 11/742,194 entitled 'Methods for fabricating polymer optical waveguides on large area panels'. Briefly, this document describes methods for fabricating polymer optical waveguides comprising a three layer structure, wherein at least one of the optical layers is deposited by a two-stage deposition process whereby the second step is a spinning process. The invention disclosed in U.S. Ser. No. 11/742,194 is of particular relevance to the volume production of polymer optical waveguides on large area substrates.

As shown in FIG. 6, the waveguide structure 20 is configured such that, in use, the waveguide structure 20 extends around at least a portion of the periphery 25 of a display 24. Preferably the waveguide structure 20 extends around the entire periphery 25 and is disposed substantially perpendicularly to the input surface 23 of a touch screen 21. Importantly, the waveguide structure 20 is engaged to a touch screen 21 such that each of the waveguides 10, 14 extends entirely below the input surface 23 of the touch screen.

In other waveguide substrate configurations, the waveguide structure 20 is a two-dimensional sheet that extends underneath and substantially parallel to the input surface 23 of a touch screen 21. One such configuration comprises four waveguide structures 20, each extending along an edge of the touch screen 21. However, in preferred configurations as shown in FIGS. 8 and 9, the waveguide structure 20 is formed on a pair of L-shaped substrates 26 that extend underneath and substantially parallel to the input surface 23 of a touch screen 21. It will be appreciated that preferably the L-shaped substrates 26 lie substantially within the periphery 25 of the touch screen. However, the L-shaped substrates could also exceed the periphery 25 of the touch screen. In other embodiments, the waveguide structures 20 may lie underneath as well as extend along at least a portion of the periphery 25 of a touch screen 21, however, not extend above the input surface 23 of the touch screen. Irrespective of the particular embodiment, it will be understood that the disclosed waveguide structures 20 are configured such that, in use, the waveguides pass through a maximum of two mutually perpendicular planes.

Referring again to the embodiment as shown in FIG. 2, the waveguide structure 20 comprises a plurality of transmit waveguides 10 adapted to carry a plurality of light signals from a light source 11, and a plurality of receive waveguides 14 adapted to carry a plurality of output signals to a multi-element detector 15. The transmit waveguides 10 are grouped on the waveguide structure 20 to define a transmit section 28, and the receive waveguides 14 are grouped to define a receive section 29. Each of the waveguides 10 and 14 includes an input portion for receiving an input signal and an output portion for transmitting an output signal. The transmit and receive waveguides 10 and 14 are positioned on the waveguide structure 20 such that the input portions 30 of the transmit waveguides 10 and the output portions 31 of the receive waveguides 14 are disposed on or proximate to a first side 32 of the waveguide structure 20, and the output portions 33 of the transmit waveguides 10 and the input portions 34 of the receive waveguides 14 are disposed on or proximate to a second side 35 of the waveguide structure 20, the first and second sides 32 and 35 being mutually opposed. Further, the input portions 30 of the transmit waveguides 10 are grouped into an input array 36, and the output portions 31 of the receive waveguides 14 are grouped together into an output array 37, with each array 36 and 37 extending along only a portion of the first side 32 for coupling with a source 11 or detector 15 respectively. It should be understood that the input array 36 of transmit waveguides 10 may include a splitter 18 for distribution of optical power to the transmit waveguides 10. In contrast, the output portions 33 of the transmit waveguides 10 and the input portions 34 of the receive waveguides 14 are spaced, preferably substantially evenly spaced, along substantially the entire length of the second side 35. However, it will be appreciated that the spacing may be selected for the particular application. It will be further appreciated that for clarity, only a few transmit waveguides 10 or receive waveguides 14 are shown in each of FIGS. 2 to 6 and 8 to 9.

Referring again to the embodiments as shown in FIGS. 3 and 4, the waveguides are positioned such that the input portions 30 of the transmit waveguides 10 and the output portions 31 of the receive waveguides 14 are disposed on or proximate to opposite sides of the waveguide structure 20. The output portions 33 of the transmit waveguides 10 and the input portions 34 of the receive waveguides 14 are disposed on or proximate to a common side 35 of the waveguide structure 20 and spaced along substantially the entire length of the common side. Preferably the waveguides are substantially evenly spaced, however it will be appreciated that the spacing may be selected for the particular application.

As shown in FIGS. 2 to 4, the input array 36 is optically coupleable with a light source 11 for supplying a light signal and the output array 37 is optically coupleable with a suitable multi-element light detector 15. The light has a predetermined wavelength that may, for example, be in the infrared region of the spectrum, preferably between 700 and 1000 nm. Alternatively, the predetermined wavelength may be in the visible region of the spectrum.

Referring in particular to the embodiment as shown in FIG. 8, the output array 37 is disposed at the terminus of one leg of the L-shaped waveguide structure 20, and the input portions 34 of the receive waveguides 14 are substantially evenly spaced along substantially the entire length of the two outer edges 39 of the L-shaped substrate 26, thereby to define an L-shaped receive section. It will be appreciated that, apart from the inclusion of an optical splitter 18, an essentially identical arrangement to that shown in FIG. 8 would function as a transmit L-shaped waveguide structure.

Additionally, waveguide structures can be overlapped to ensure that the entire periphery 25 of a touch screen 21 is accessible to either the transmit section 28 or receive section 29 of a waveguide structure 20. For example, the waveguide structures shown in FIG. 3 and FIG. 4 can be folded around the periphery 25 of the touch screen 21 with a source 11 and a detector 15 overlapped in one corner, as clearly shown in FIG. 7. A source 11 and detector 15 could be located on a single chip. It should be noted that the waveguide structure shown in FIG. 2 requires a source 11 and a detector 15 to be located below the touch screen 21, whereas the waveguide structures shown in FIGS. 3 and 4 allow a source 11 and a detector 15 to be located beside the touch screen 21. The latter two waveguide structures may be preferable if it is important to minimise the depth of the device as a whole. In yet another configuration, the receive-side waveguide structure shown in FIG. 8 and a similar transmit-side waveguide structure can be engaged in overlapping fashion to the underside of a display 24, as shown in FIG. 9. It will be appreciated that this overlapping arrangement may require a degree of flexibility in each waveguide structure for out-of-plane bending, but this will be trivial if, as preferred, the substrates 26 are composed of plastics materials.

Figure 1:
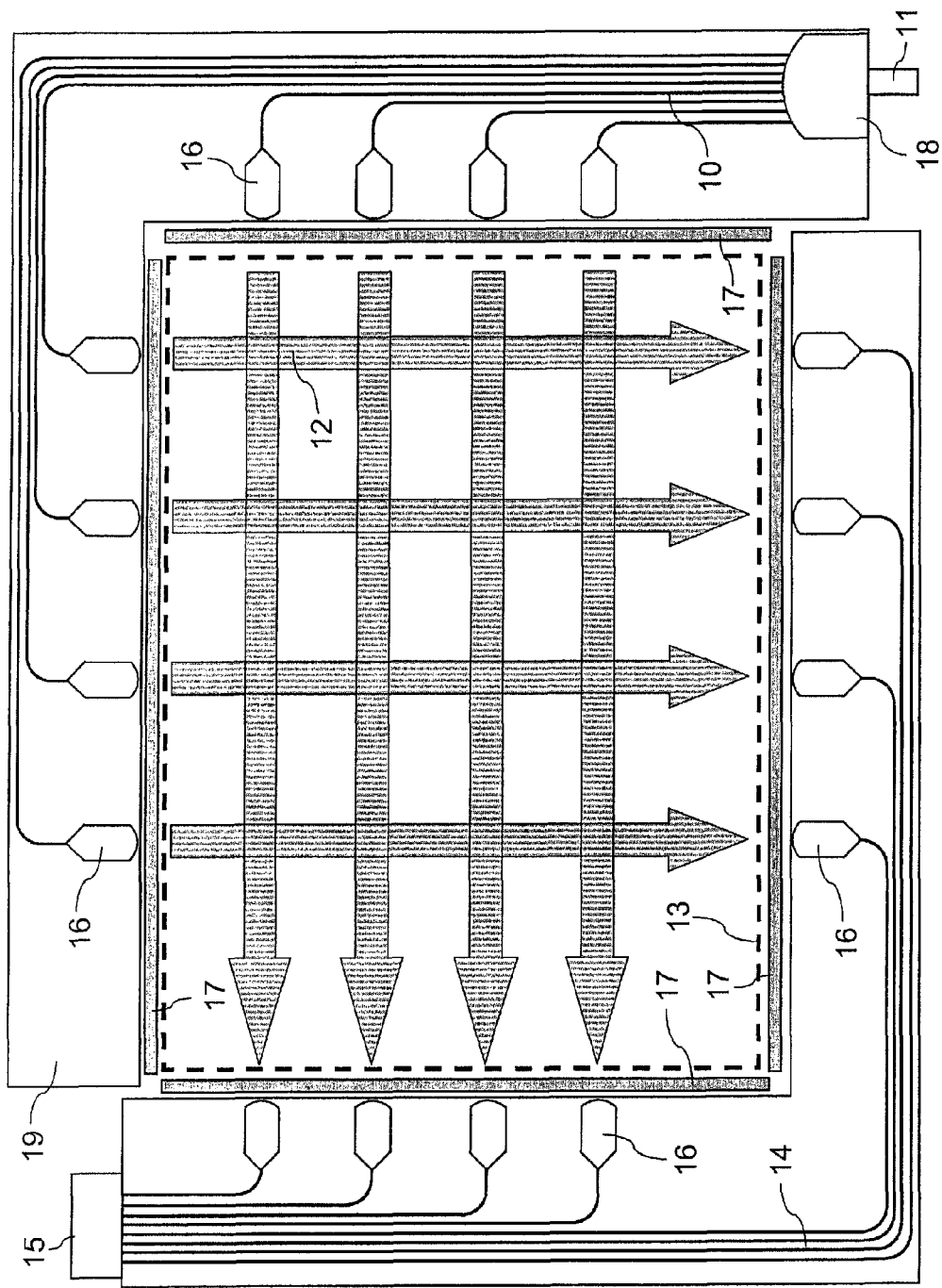
FIG. 1 illustrates a typical prior art waveguide-based optical touch screen sensor.
Figure 16:
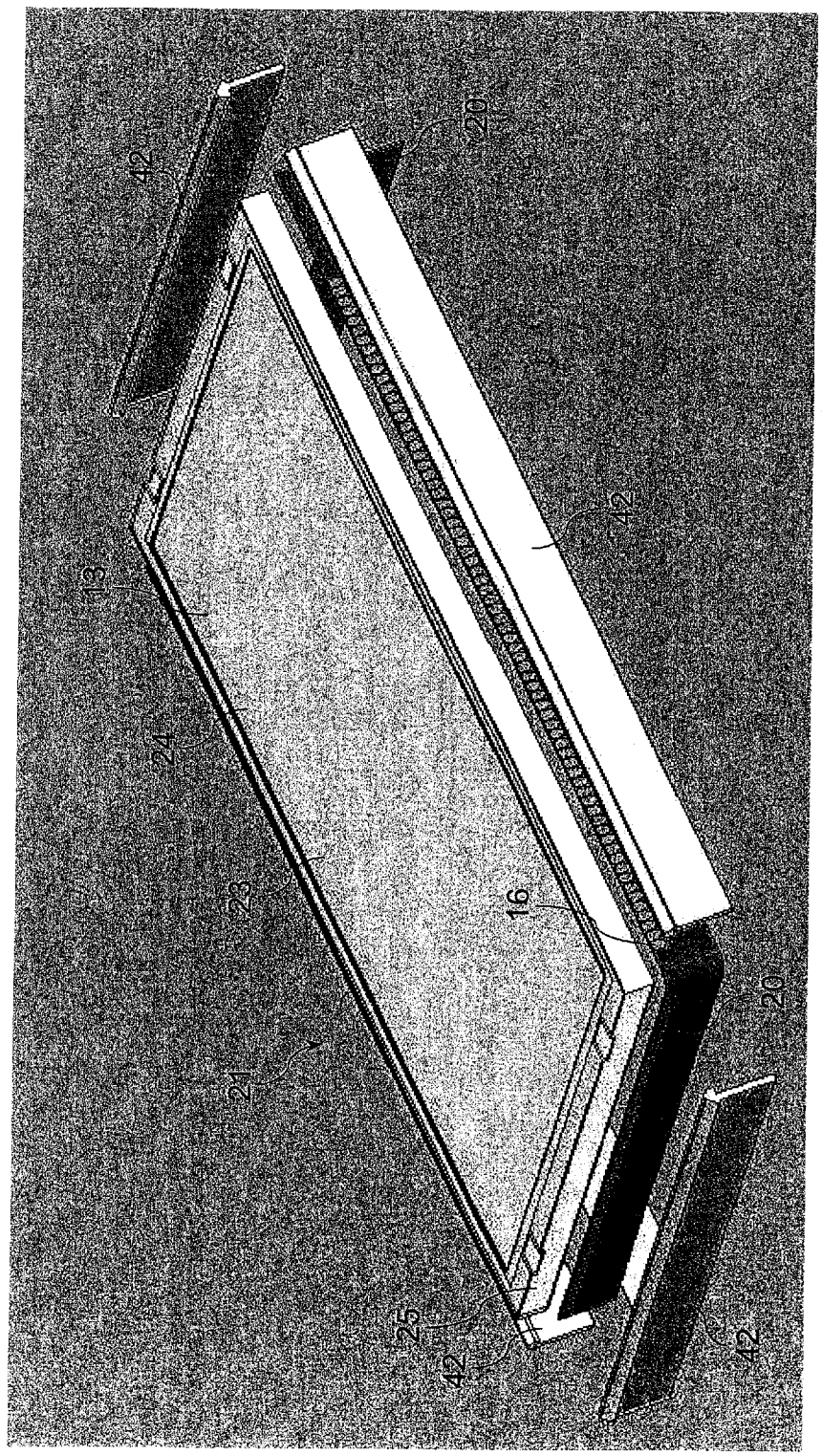
FIG. 16 is an exploded perspective view of a display, a waveguide structure in accordance with this disclosure and an optical element in accordance with this disclosure.

For clarity, the waveguide structures 20 illustrated in FIGS. 2 to 6 and 8 to 9 show the output portions 33 of the transmit waveguides 10 and the input portions 34 of the receive waveguides 14 extending to edge(s) 35 or 39 of each structure. In some embodiments this will indeed be the case. In other embodiments, the output portions 33 or the input portions 34 (or both) each include an integral structure for collimating the light beams in the plane of the input surface 23. Generally the integral structure is in the form of a planar lens 16, as shown in FIG. 1 and FIG. 16. Alternatively, the integral structure may be a planar internally reflective minor, as disclosed in U.S. Pat. No. 7,352,940, entitled 'Waveguide design incorporating reflective optics'.

In the waveguide structures 20 shown in FIGS. 2 to 4, the transmit waveguides 10 and receive waveguides 14 are provided on a single substantially rectangular strip designed to be folded around the entire periphery of the touch screen. It will be appreciated that the larger the touch screen, the longer the rectangular strip needs to be, however this will be limited by the size of the substrate used for waveguide fabrication. The waveguide fabrication techniques disclosed in U.S. Pat. No. 7,811,640 will clearly be applicable to this situation. If substrate size is a limitation it is of course possible to fabricate the transmit waveguides and receive waveguides on separate substantially rectangular strips, each of which would be folded around two sides of the periphery, for example as shown in FIG. 5.

Irrespective of whether the transmit waveguides and receive waveguides are fabricated on separate strips or a single strip, a key advantage of fabricating the waveguides on rectangular strips, as shown in FIGS. 2 and 3, compared to the prior art L-shaped waveguide structures as shown in FIG. 1, is that it is significantly easier to singulate rectangular structures than L-shaped structures with a dicing saw. In particular, the interior sides of an L-shaped structure are difficult to cut with a dicing saw. It will be noted that the waveguide structure shown in FIG. 4 has a recess 61, designed to facilitate electrical connections to the touch screen 21. The recess 61 will complicate the singulation process, but since there are no transmit waveguide outputs 33 or receive waveguide inputs 34 along the side 62 incorporating the recess 61, that side can be shaped with a cruder stamping process while the straight sides are diced. Similarly, an advantage of the L-shaped configuration shown in FIG. 8 compared to the prior art L-shaped configuration shown in FIG. 1 is that the inner edges 38 of the L-shaped waveguide structure having no receive waveguide inputs 34, can be shaped with a cruder stamping process while the outer edges 39 can be diced with a dicing saw. It will be appreciated that even if the transmit waveguides 10 and receive waveguides 14 terminate in an integral structure such as a planar lens 16 with a curved optical interface (as shown in FIG. 1), it is desirable to cut the substrate as close as possible to the optical interface; this requires the precision of a dicing saw and is not suited to a stamping process.

As discussed above with regard to FIGS. 5 to 7, the waveguide structures 20 are preferably substantially flexible for assisting in folding around the periphery 25 of a touch screen 21. In the embodiments shown in FIGS. 2 to 4, a waveguide structure 20 includes at least one fold line 41 defined by a line of weakness to assist in the installation around a touch screen 21. In alternative embodiments, the fold line 41 is a printed mark visible to a machine vision system when the waveguide structure 20 is machine assembled with a touch screen 21. Alternatively the printed mark may assist with manual assembly of the waveguide structure 20 with a touch screen 21.

Turning now to FIGS. 10 to 15, an optical element 42 for a touch screen 21 is shown comprising a first reflective surface 43 for reflecting a light signal 44 in a direction substantially parallel to the input surface 23, coincident with the outer surface of a display 24, and a connect portion 45 adapted for connection to the waveguide structure 20. The optical element 42 is configured for use with a touch screen 21 such that, in use, the first reflective surface 43 is positioned above the input surface 23 of a touch screen 21 to re-direct a light signal 44 to or from the waveguide structure 20. Preferably the connect portion 45 is at least partially below the input surface 23.

The optical element 42 further includes a body of light transmissive material 46 for transmission of a light signal 44 between the connect portion 45 and the first reflective surface 43.

Figure 14:
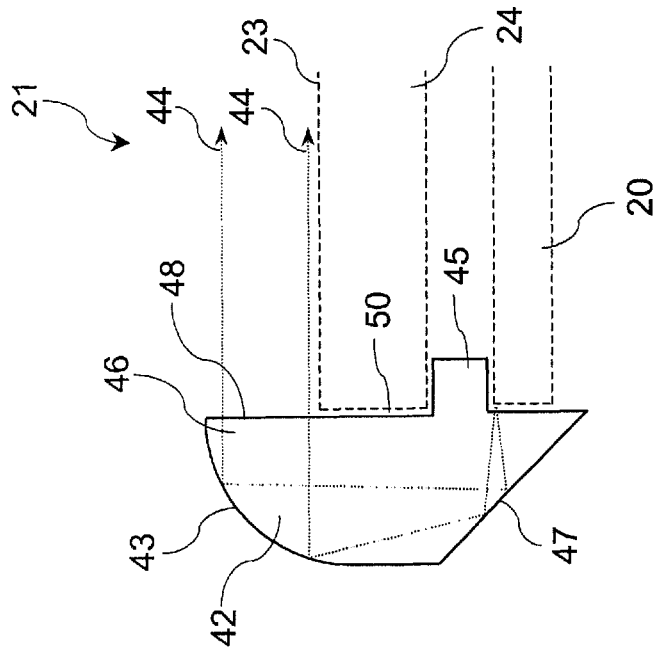
FIG. 14 is a sectional side view of another embodiment of an optical element in accordance with this disclosure shown engaged to a display and having a waveguide structure optically engaged thereto, wherein the waveguide structure is positioned beneath and parallel to the display.
Figure 15:
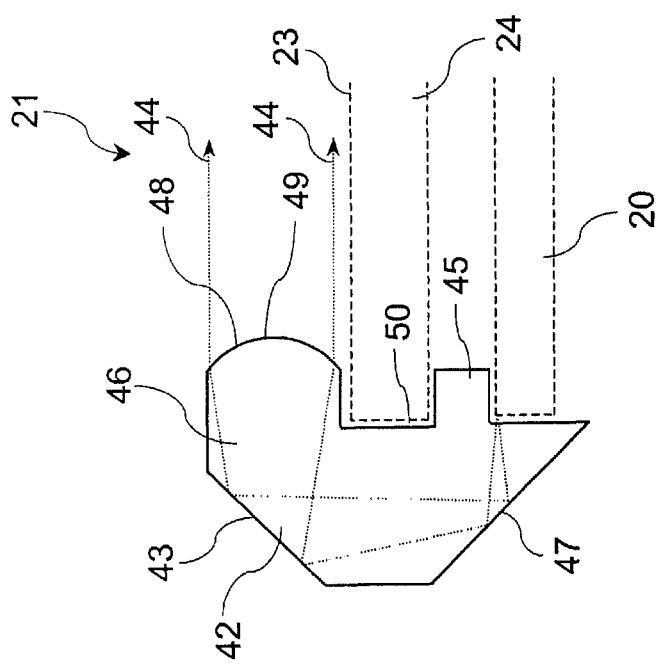
FIG. 15 is a view similar to FIG. 14 but showing another embodiment of an optical element in accordance with this disclosure.

In other embodiments, as shown in FIGS. 14 and 15, the optical element 42 further includes a second reflective surface 47 that, in use, is positioned below the input surface 23, and where the waveguide structure 20 extends underneath and substantially parallel to the input surface.

It will be appreciated that an optical element 42 could be constructed such that one or both of the reflective surfaces are externally reflective (i.e. conventional) mirrors rather than internally reflective surfaces. However a construction where an optical element 42 has internally reflective surfaces, as shown for example in FIGS. 10 to 15, is preferred for robustness and ease of manufacture (by injection moulding for example). Further, an externally reflective mirror would need to be metallised, whereas the internally reflective surfaces may not need to be metallised if the condition for total internal reflection is met. Those skilled in the art will understand that this can be ensured by appropriate design of the optical element.

As shown in FIG. 16, an optical element 42 may be formed as an elongate strip of plastics material substantially transparent to the signal light (e.g. infrared light). Desirably, the optical element 42 is opaque to light of other wavelengths (e.g. ambient visible light if the signal comprises infrared light). The optical element 42 may be injection moulded or extruded and may be substantially rigid.

The first internally reflective surface 43 may be curved thereby to focus a light signal 44 in a direction substantially perpendicular to the plane of the input surface 23, as shown for example in FIGS. 10 to 12 and 15. Alternatively, the first reflective surface 43 may be planar, as shown for example in FIGS. 13 and 14. The second reflective surface 47, where present, may likewise be curved or planar. If either the first or second reflective surfaces are curved, they are preferably curved in a cylindrical fashion so as to focus a plurality of signals associated with a plurality of waveguides.

Figure 10:
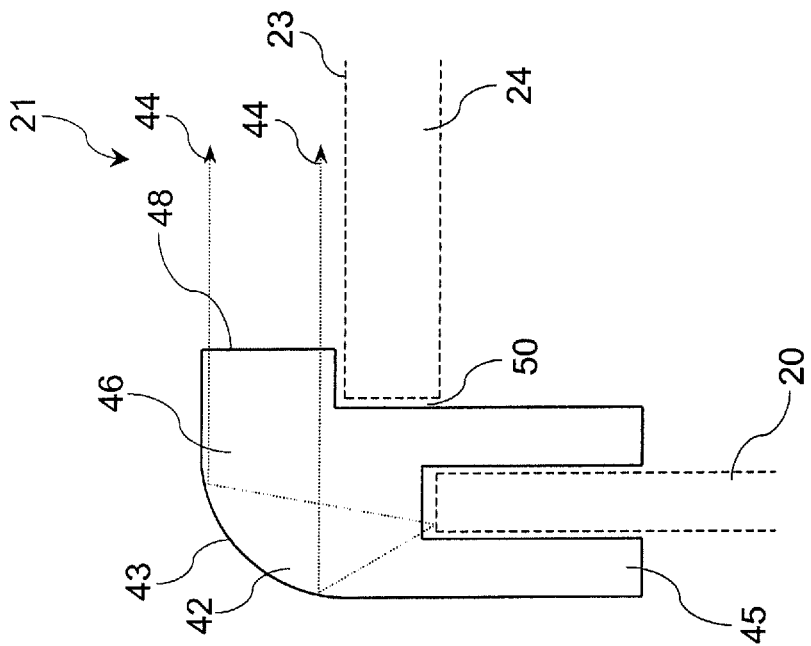
FIG. 10 is a sectional side view of one embodiment of an optical element in accordance with this disclosure shown engaged to a display and having a waveguide structure optically engaged thereto, and directing light from the waveguide across the upper surface of the display.
Figure 12:
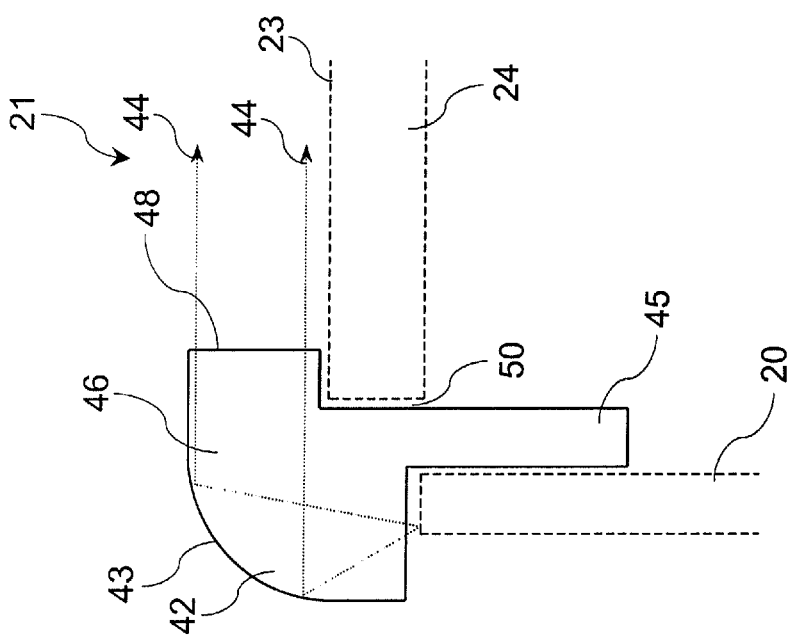
FIG. 12 is a view similar to FIG. 10 but showing a further embodiment of an optical element in accordance with this disclosure.

As shown in FIGS. 10 to 15, the optical element 42 has an optical surface 48 through which light 44 passes as it transits a touch screen 21. In some embodiments, for example as shown in FIGS. 10, 12 and 15, this optical surface 48 may be planar. Alternatively, as shown for example in FIGS. 11, 13 and 14, it may be curved to form a lens portion 49 so as to focus a light signal 44 in a direction substantially perpendicular to the plane of the input surface 23. Preferably, the lens portion 49 is curved in a cylindrical fashion so as to focus a plurality of signals associated with a plurality of waveguides. Irrespective of the precise shape of the optical surface 48, the optical element 42 may be shaped such that, in use, the exterior angle between the input surface 23 and the optical surface 48 is greater than or equal to 90° (as shown in FIGS. 10, 12, 13 and 15 for example), to minimise the build-up of dirt over time which could potentially obscure the optical surface 48. In other embodiments, optical elements engaged to the transmit and receive sections of the waveguide structure have different optical surfaces. For example, the transmit-side optical elements may have a planar optical surface 48 and the receive-side optical elements may have an optical surface in the form of a lens 49.

Preferably the optical element 42 includes a recess 50 such that the optical element 42 is releasably attachable to a display 24. In certain embodiments the optical element 42 is configured as a single piece having physical dimensions matching the periphery 25 of a display 24 such that the optical element 42 is adapted to 'clip' onto the display. Alternatively, the optical element 42 can be glued onto a display 24. In other embodiments the optical element 42 may be configured as two L-shaped pieces each adapted to clip around two adjacent sides of a display, or as four straight pieces each adapted to be attached to one side of a display 24 (as shown in FIG. 16).

The waveguide structure 20 may be fixedly attached to the optical element 42 by gluing. However, it will be appreciated that any method of attachment that provides sufficient and stable optical communication between the waveguides 10, 14 and the optical element 42 will be suitable.

Figure 13:
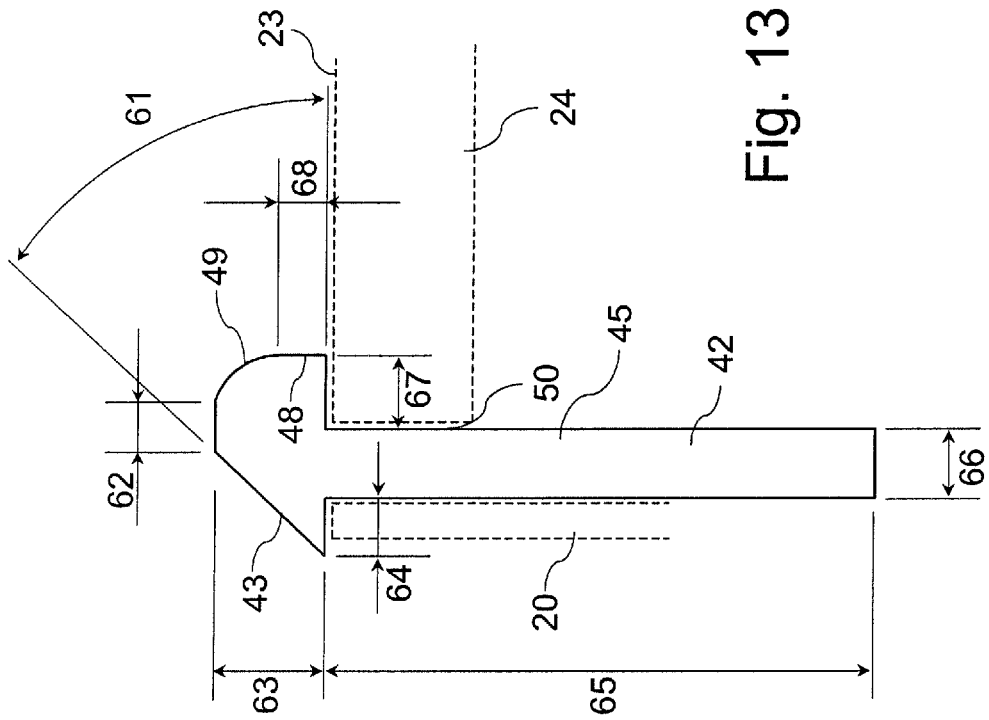
FIG. 13 is a view similar to FIG. 10 but showing yet another embodiment of an optical element in accordance with this disclosure.

A particularly preferred design for an optical element 42 is shown in FIG. 13, with an internally reflective surface 43, a recess 50 and an optical surface 48 comprising a lens portion 49. In this particular design, the internally reflective surface 43 is a plane surface inclined at an angle 61 of 49° to the horizontal, and the lens portion 49 forms an exterior angle of approximately 90° with the input surface 23 such that there is no re-entrant cavity between the two where dirt may collect. Because the internally reflective surface 43 is angled at 49° to the horizontal, instead of 45°, the lens portion 49 is still able to collimate the signal light 44 parallel to the input surface 23. By way of specific example, the dimensions 62, 63, 64, 65, 66, 67 and 68 of the optical element 42 are 3.9 mm, 10 mm, 4.4 mm, 30 mm, 6 mm, 6.4 mm and 3.6 mm respectively, and the lens portion 49 has a radius of curvature of 7.2 mm. Furthermore, the waveguide structure 20 is oriented such that its waveguides are on the surface adjacent to the connect portion 45.

Referring now to FIG. 16, an apparatus for use in an input device is shown comprising a touch screen 21, a pair of waveguide structures 20, and four optical elements 42. The pair of waveguide structures 20 correspond to a transmit waveguide structure and a receive waveguide structure which, together, extend along substantially the entire periphery 25 of a display 24. The four optical elements 42 are engaged to the waveguide structures 20 in use and are in optical communication with respective waveguides of the waveguide structures 20. However, it will be appreciated that a pair of L-shaped optical elements, or a one-piece optical element would also be suitable. It will be appreciated that each of the optical elements 42 extends from a position below the input surface 23 to a position above the input surface 23 such that each optical element 42 transmits input or output signals to or from the input area 13 of a touch screen 21 between respective waveguides of the waveguide structures 20, which extend entirely below the input surface 23. The planar lenses 16 of each waveguide can be seen in FIG. 16. These lenses 16 collimate light into and from the optical elements 42, such that signal beams passing across the input surface 23 of a touch screen 21 are focused in the plane of the input surface. It will be noted that in this particular configuration, unlike the configuration shown in FIG. 13, the waveguide structures 20 are positioned between the display 24 and the optical elements 42.

In one example, a method of transmitting input and output signals for a touch screen device is disclosed. The method comprises providing a waveguide structure 20, providing one or more optical elements 42, and then optically coupling the waveguide structure 20 with a respective optical element 42 such that, in use, each optical element 42 transmits input or output signals to or from the input area 13 of a touch screen 21 to a respective waveguide of a waveguide structure 20 extending entirely below the input surface 23.

Figure 18:
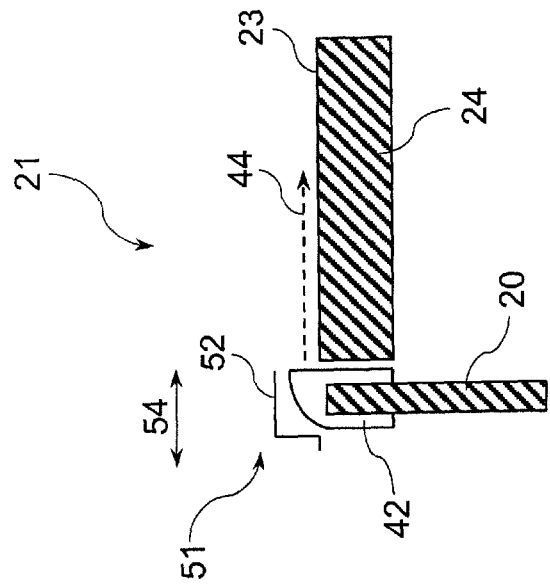
FIG. 18 is a sectional side view of the combined waveguide structure and optical element of one embodiment engaged to a display showing the relatively reduced bezel dimensions required.
Figure 17:
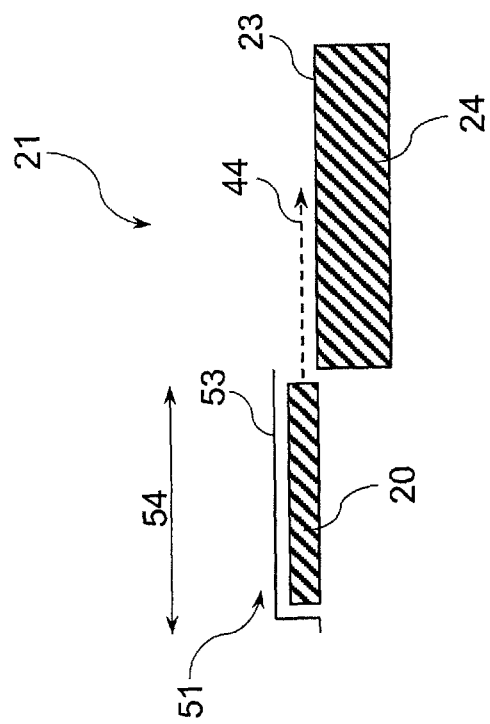
FIG. 17 is a sectional side view of a prior art waveguide-based optical touch input device showing the relatively wide bezel dimension required to accommodate the waveguide structure and associated optics.

In a further example, referring to FIG. 17 (prior art) and FIG. 18, a disclosed method of reducing the width 54 of a bezel 51 in a touch screen 21. The method comprises providing a waveguide structure 20, providing one or more optical elements 42, and then optically coupling the waveguide structure 20 with a respective optical element 42 such that, in use, each optical element 42 transmits an input or output signal 44 to or from the waveguide structure 20. The optical elements 42 extend from above the input surface 23 to a position below the input surface and the waveguides of each waveguide structure 20 are terminated at a position below the input surface.

It will be appreciated that the disclosed structures and methods provide a substantially reduced bezel dimension 54 (FIG. 18) compared with prior art devices (FIG. 17). The bezel requirements (FIG. 18) essentially comprise a thin raised 'lip' 52 surrounding a display 24. In contrast, the bezel requirements for prior art devices (FIG. 17) comprise a relatively wide raised flange 53 surrounding a display 24.

In yet a further example, a method is disclosed for reducing the tolerance required of an optical element used to provide focussing of optical signals in a direction substantially perpendicular to the plane of an input device. To illustrate, FIGS. 19(a) and 19(b) show plan and side views of a typical prior art assembly of an output portion 33 of a transmit waveguide 10 having an external vertical collimating lens (VCL) 17, wherein the transmit waveguide 10 and VCL 17 are mounted on a common base 71. An essentially identical arrangement is normally present on the receive side. Typically, a transmit waveguide 10 comprises a substrate 72, a lower cladding layer 73, a core layer 74 and an upper cladding layer 75, with the core layer 74 terminating with an integrated planar lens 16 that collimates the light signal 44 in the plane of an adjoining input area. Note that for clarity the substrate 72, lower cladding layer 73 and upper cladding layer 75 have been omitted from FIG. 19a. It will be appreciated that a light signal 44 launched from the end face 76 of a planar lens 16 will diverge in the direction perpendicular to the plane of the input area. As a consequence it is often desirable for the light signal 44 to be focussed in this direction as well. However, such 'out of plane' focussing requires a lens having curvature in that direction, which is difficult to shape reliably with photolithographic techniques. Consequently an external lens is employed for this task, for example a VCL 17. The VCL is generally curved in a cylindrical fashion so as to focus a plurality of signals associated with a plurality of waveguides.

It will be appreciated that the gap 77 between the end face 76 of the planar lens 16 and the curved face 78 of a VCL 17 contributes to the overall bezel width in a prior art device, and should ideally be minimised. However this requires the VCL to be a relatively powerful lens, i.e. to have a small radius of curvature. Those skilled in the art of micro-optics will understand that such a high magnification optical system is extremely susceptible to errors in the design and manufacture of a VCL, and in its placement with respect to the waveguides.

Certain embodiments, on the other hand, provide such 'out of plane' focussing, via an optical element 42, as shown in FIGS. 10 to 15. For example, 'out of plane' focusing may be provided by a lens portion 49, a first reflective surface 43, a second reflective surface 47 or a combination of the above. Particularly notable are the embodiments shown in FIGS. 13 and 14, where 'out of plane' focussing is provided by a lens portion 49, such that the distance between the waveguides in the waveguide structure 20 and the lens portion 49 is greatly increased compared to the gap 77 of the prior art device. An optical element 42 may be designed such that two or more of the lens portion 49, first reflective surface 43 and second reflective surface 47 provide the 'out of plane' focussing in combination, as shown for example in FIG. 11. Such an arrangement may further relax the tolerances required for the optical element, since an optical system comprising two or more weaker focussing elements in series is generally more tolerant to alignment 'errors' than a system of equivalent magnification comprising a single relatively more powerful optical element.

It will be appreciated that the illustrated apparatus provides many advantages over prior art devices, including but not limited to the following:

1.) Mounting the waveguide structure and the disclosed optical element to a touch screen allows the bezel dimensions to be relatively reduced compared to prior art devices.
2.) The waveguide structures provide a number of cost savings compared to prior art L-shaped waveguide structures. For example, from a manufacturing perspective it is relatively simpler to singulate a waveguide structure configured in rectangular strips than an L-shaped waveguide structure.
3.) Assembling a disclosed input device utilising the waveguide structures and optical elements is relatively cheaper compared to prior art devices. Additionally, the disclosed techniques require relatively fewer components than prior art devices.
4.) The configurations of the disclosed structures mean that the source and detector can be physically located adjacent to each other or, preferably, on the same chip. This simplifies the layout of the internals of the input device and reduces production costs.
5.) From an aesthetics perspective, a thin bezel 'lip' surrounding the touch screen is more appealing than a relatively wide flange surrounding the touch screen.
6.) The optical element with the waveguide structure attached thereto can be fabricated as a single unit having physical dimensions matching the periphery of the touch screen. The optical element can then be simply clipped onto the touch screen thereby avoiding alignment issues and simplifying installation and reducing the installation costs.
7.) The apparatus and methods disclosed herein enable a relatively larger touch screen to be provided on the device for the same overall dimensions because the bezel space requirements are now reduced. This satisfies the intent of many designers, which is to make the touch display of comparable width to the device itself. The advantage of this is that the user obtains the largest possible display size for a given device size, which is both practical and aesthetically pleasing.
8.) The disclosed apparatus and methods relax the tolerances on the design, manufacture and placement of optical elements used to focus the optical signals in the direction perpendicular to the input area.
9.) The disclosed embodiments may be used in conjunction with other transmit or receive optics. For example U.S. Pat. No. 7,099,553 discloses a touch input device where the signal light is launched across the input area by an L-shaped light pipe with a plurality of reflective facets, instead of discrete transmit-side optical waveguides
10.) In this sort of device, the waveguide structures and optical elements could still be used on the receive side.

In yet another alternative, the waveguide structures and optical elements could be used on the transmit side of an optical input device, and with the receive waveguides 14 and multi-element detector 15 replaced by one or more arrays of discrete detectors.

Although the disclosed embodiments have been described with reference to specific examples, it will be appreciated by those skilled in the art that the disclosed embodiments may take many other forms.

The invention claimed is:

1. A waveguide structure for an input device, the waveguide structure comprising:
 an input surface defining a plane;
 at least one optical waveguide adapted to carry a signal for the input device; and
 an optical element having a connect portion for optically connecting to said at least one optical waveguide,
 wherein the waveguide structure is configured such that, in use, the at least one optical waveguide extends entirely below the plane, and
 wherein the optical element extends above the plane and the connect portion extends entirely below the plane beyond an end of the at least one optical waveguide.

2. A waveguide structure according to claim 1 wherein each of the at least one optical waveguides extends entirely below the plane.

3. A waveguide structure according to claim 1 wherein the waveguide structure is configured such that, in use, the at least one optical waveguide passes through a maximum of two mutually perpendicular planes.

4. A waveguide structure according to claim 1 wherein the waveguide structure extends around at least two adjacent sides of the periphery of the input device.

5. A waveguide structure according to claim 1 wherein the waveguide structure comprises a plurality of waveguides selected from the group consisting of a plurality of transmit waveguides adapted to carry an input signal to the input device, a plurality of receive waveguides adapted to carry an output signal from the input device, and a combination thereof.

6. A waveguide structure according to claim 5 wherein the transmit waveguides are grouped on the waveguide structure to define a transmit section and/or the receive waveguides are grouped on the waveguide structure to define a receive section.

7. A waveguide structure according to claim 6 wherein each waveguide includes an input portion for receiving an input signal and an output portion for transmitting an output signal, wherein the waveguides are positioned such that the input portions of the transmit waveguides and the output portions of the receive waveguides are disposed on or proximate to a first side of the waveguide structure, and the output portions of the transmit waveguides and the input portions of the receive waveguides are disposed on or proximate to a second side of the waveguide structure.

8. A waveguide structure according to claim 7 wherein the input portions of the transmit waveguides are grouped into an input array, and the output portions of the receive waveguides are grouped into an output array, wherein each array extends along a portion of the first side.

9. A waveguide structure according claim 6 wherein each waveguide includes an input portion for receiving an input signal and an output portion for receiving an output signal, and wherein the waveguides are positioned such that the input portions of the transmit waveguides and the output portions of the receive waveguides are disposed on or proximate to opposite sides of the waveguide structure, and the output portions of the transmit waveguides and the input portions of the receive waveguides are disposed on or proximate to a common side of the waveguide structure.

10. A waveguide structure according to claim 1 wherein the waveguide structure extends underneath and substantially parallel to the plane.

11. A waveguide structure according to claim 10 wherein the waveguide structure comprises one or more L-shaped sheets.

12. A waveguide structure according to claim 10 wherein the waveguide structure lies within the periphery of the input device.

13. A waveguide structure according to claim 10 wherein the waveguide structure comprises a plurality of waveguides selected from the group consisting of: a plurality of transmit waveguides adapted to carry an input signal to the input device, a plurality of receive waveguides adapted to carry an output signal from the input device, and a combination thereof.

14. An optical element for an input device having an input surface defining a plane, the optical element comprising:
a first reflective surface; and
a connect portion for optically connecting to a waveguide structure having at least one optical waveguide adapted to carry an input signal or an output signal for the input device,
the optical element being configured for use with the input device such that, in use, the first reflective surface is positioned above the plane to re-direct the signal to or from the optical waveguide, the connect portion being at least partially below the plane whereby the at least one optical waveguide extends entirely below the plane and the connect portion extends beyond an end of the at least one optical waveguide.

15. An optical element according to claim 14 further comprising a body of light transmissive material for transmission of the signal between the connect portion and the first reflective surface.

16. An optical element according to claim 14 wherein said optical element is formed as a strip of plastics material substantially transparent to light of the infrared region of the spectrum and opaque to ambient visible light.

17. An optical element according to claim 14, wherein the first reflective surface focuses the signal in a direction substantially perpendicular to the plane.

18. An optical element according to claim 14, further comprising a second reflective surface, such that, in use, the second reflective surface is positioned below the plane so as to re-direct the signal to or from the optical waveguide extending underneath and substantially parallel to the plane.

19. An apparatus comprising:
an input device having an input surface defining a plane and having a periphery;
a waveguide structure having at least one optical waveguide adapted to carry an input signal or an output signal for the input device; and
one or more optical elements extending along at least a portion of the periphery in optical communication with the at least one waveguide and the one or more optical elements being adapted to optically connect to the waveguide structure, each optical element extending from a position below the plane to a position above the plane such that, in use, each the optical element transmits the input signal or the output signal to or from the input surface to the at least one waveguide extending entirely below the plane,
wherein each optical element extends below the plane beyond an end of the at least one optical waveguide.

20. An apparatus according to claim 19, wherein the waveguide structure extends underneath and substantially parallel to the plane.

21. A method of transmitting input and output signals for an input device, the input device having an input surface defining a plane and having a periphery, the method comprising:
providing at least one waveguide structure having at least one optical waveguide adapted to carry an input signal or an output signal for the input device, the at least one optical waveguide extending entirely below the plane;
providing one or more optical elements along at least a portion of the periphery; and
optically connecting the waveguide structure with a respective optical element such that, in use, each the optical element transmits the input signal or the output signal to or from the input surface to a respective waveguide extending entirely below the plane,
wherein each optical element extends below the plane beyond an end of the at least one optical waveguide.

22. A method according to claim 21, wherein the waveguide structure is provided underneath and substantially parallel to the plane.

23. A method of reducing bezel width in an input device, the input device having an input surface defining a plane and having a periphery, the method comprising:
providing at least one waveguide structure having at least one optical waveguide adapted to carry an input signal or an output signal for the input device;
providing one or more optical elements along at least a portion of the periphery; and optically connecting the at least one optical waveguide with a respective optical element such that, in use, each the optical element transmits the input signal or the output signal to or from the at least one optical waveguide;
wherein the at least one optical waveguide is terminated at a position below the plane, and wherein the optical elements extend from above the plane to a position below the plane, and
wherein each optical element extends below the plane beyond the position where the at least one optical waveguide is terminated.

24. A method according to claim 23, wherein the at least one waveguide structure is provided underneath and substantially parallel to the plane.

* * * * *